June 28, 1966   W. D. BEASLEY   3,258,162
METERING DEVICE FOR GRANULAR MATERIAL
Filed Oct. 6, 1964   6 Sheets-Sheet 1

WILLIAM D. BEASLEY
INVENTOR.

BY
Wayland D. Keith
HIS AGENT

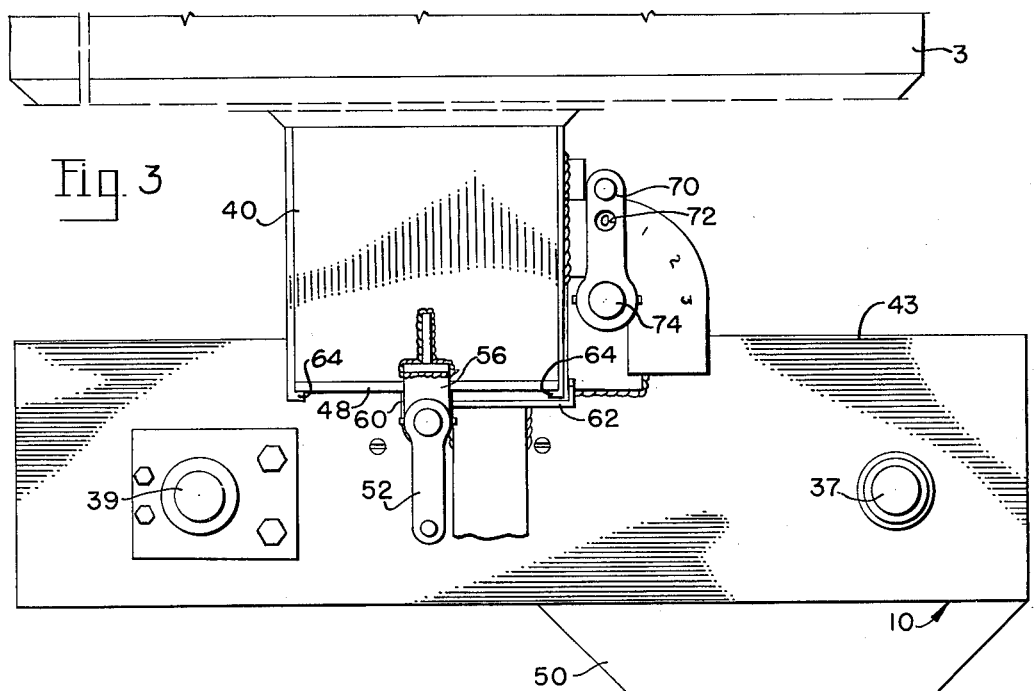
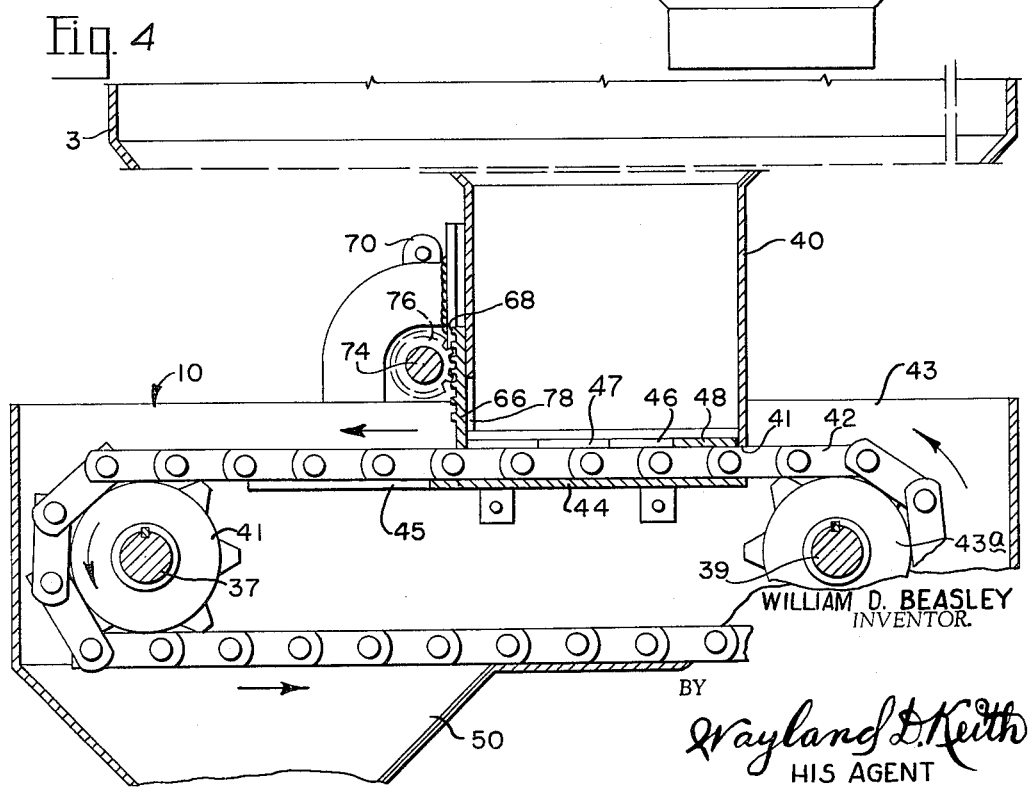

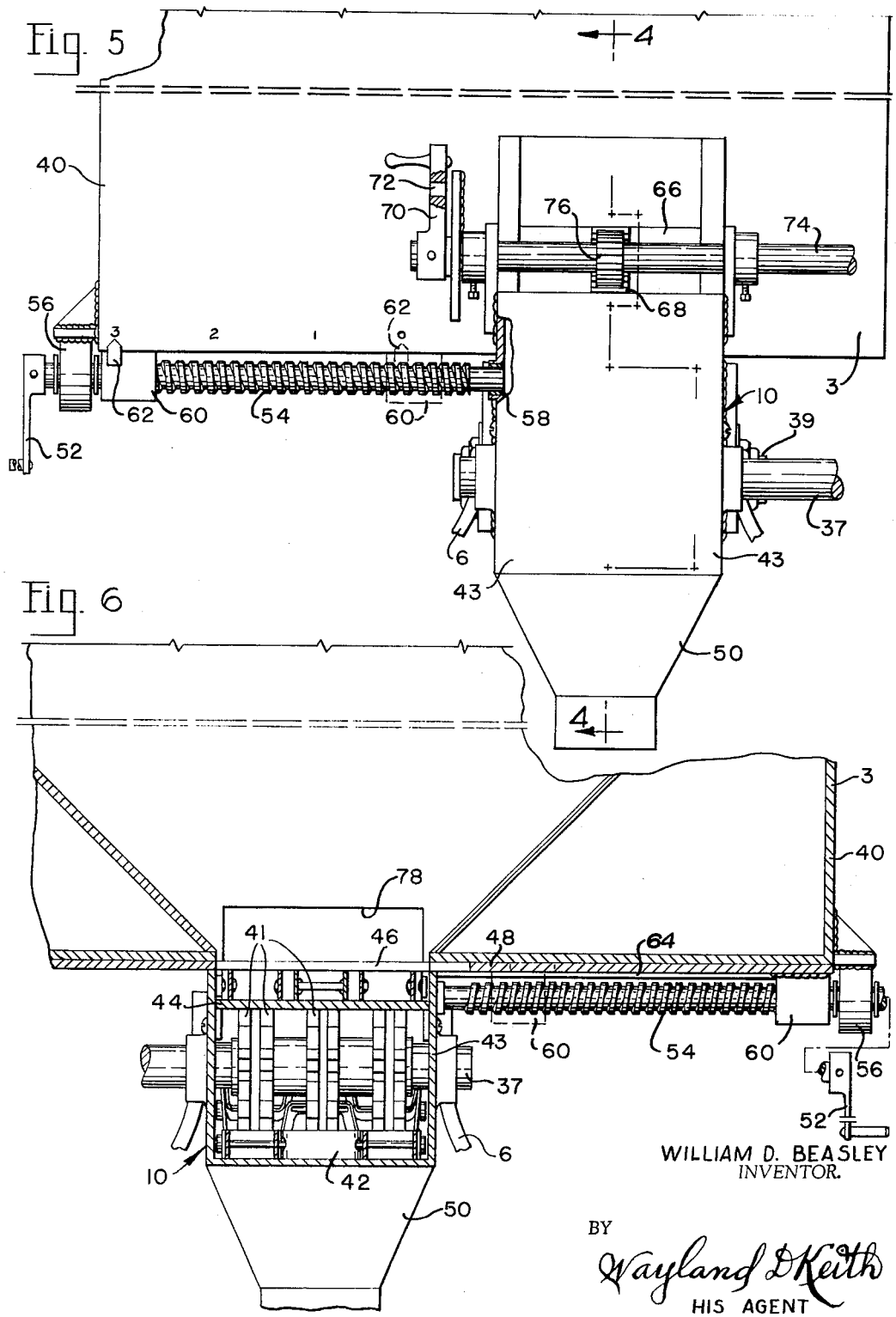

June 28, 1966    W. D. BEASLEY    3,258,162
METERING DEVICE FOR GRANULAR MATERIAL
Filed Oct. 6, 1964    6 Sheets-Sheet 4
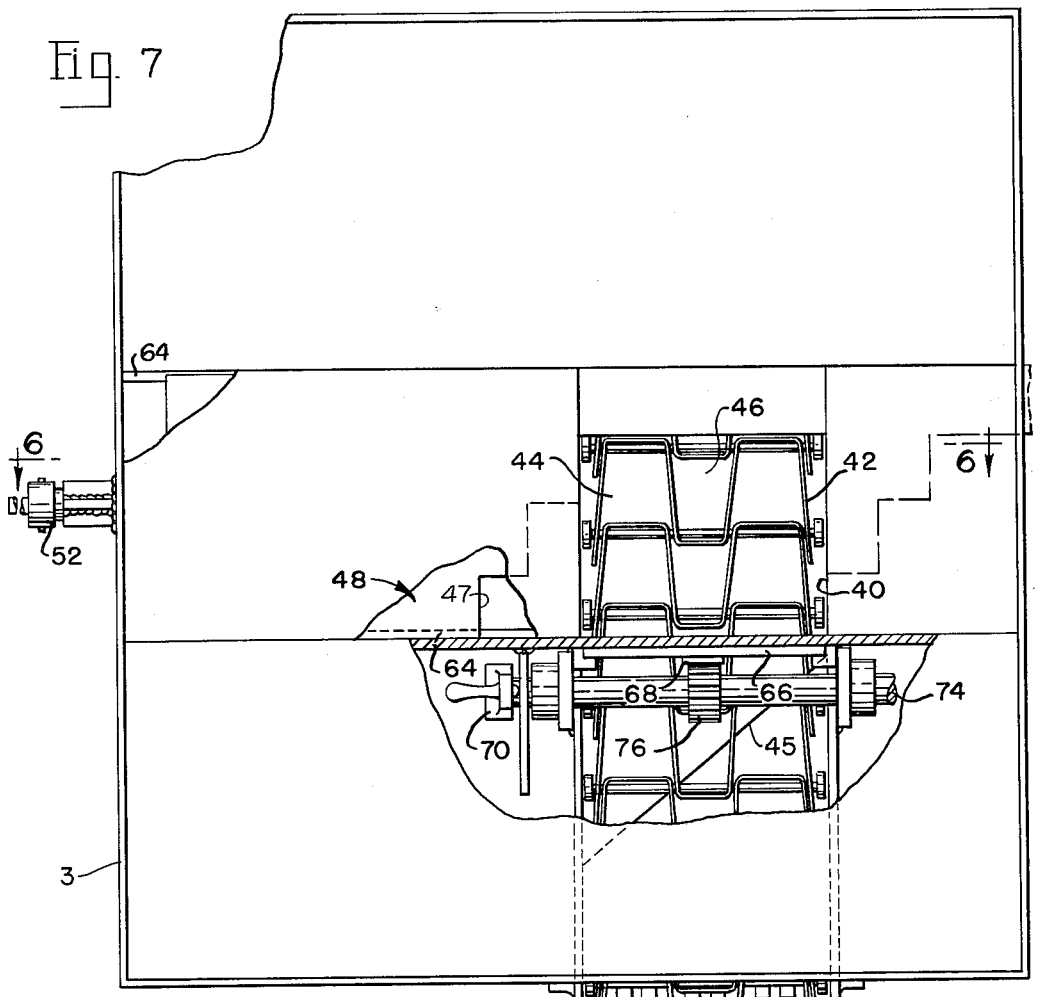
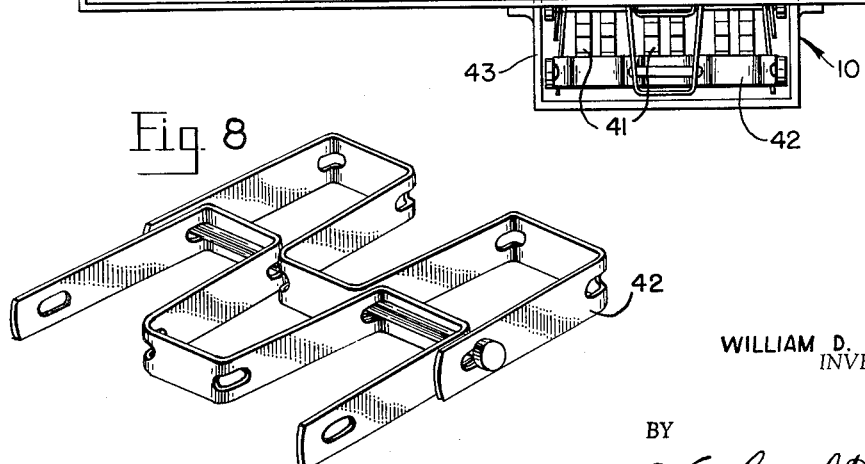
WILLIAM D. BEASLEY
INVENTOR.
BY
Wayland D. Keith
HIS AGENT June 28, 1966  W. D. BEASLEY  3,258,162
METERING DEVICE FOR GRANULAR MATERIAL
Filed Oct. 6, 1964  6 Sheets-Sheet 5
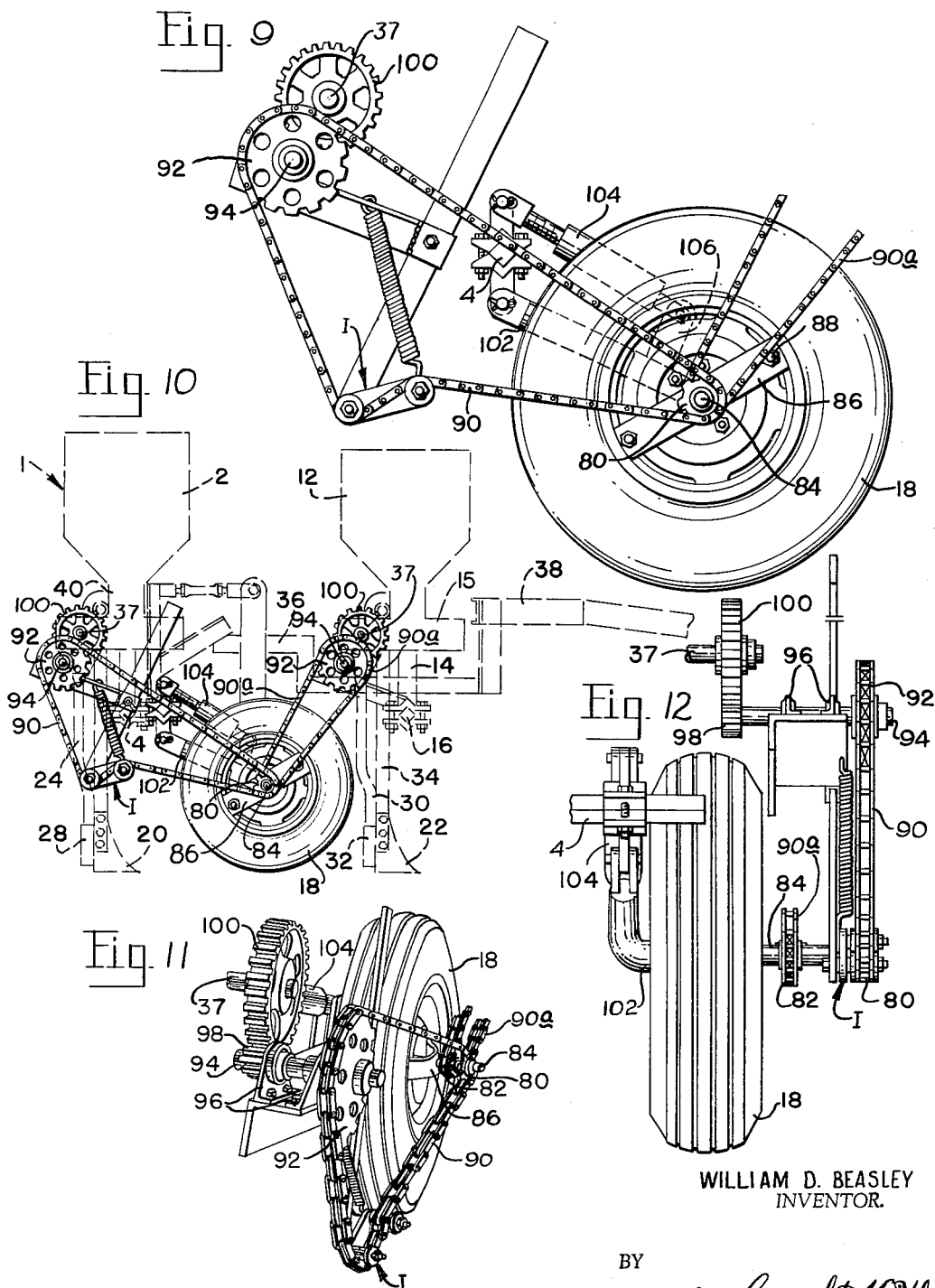
WILLIAM D. BEASLEY
INVENTOR.
BY
Wayland D. Keith
HIS AGENT

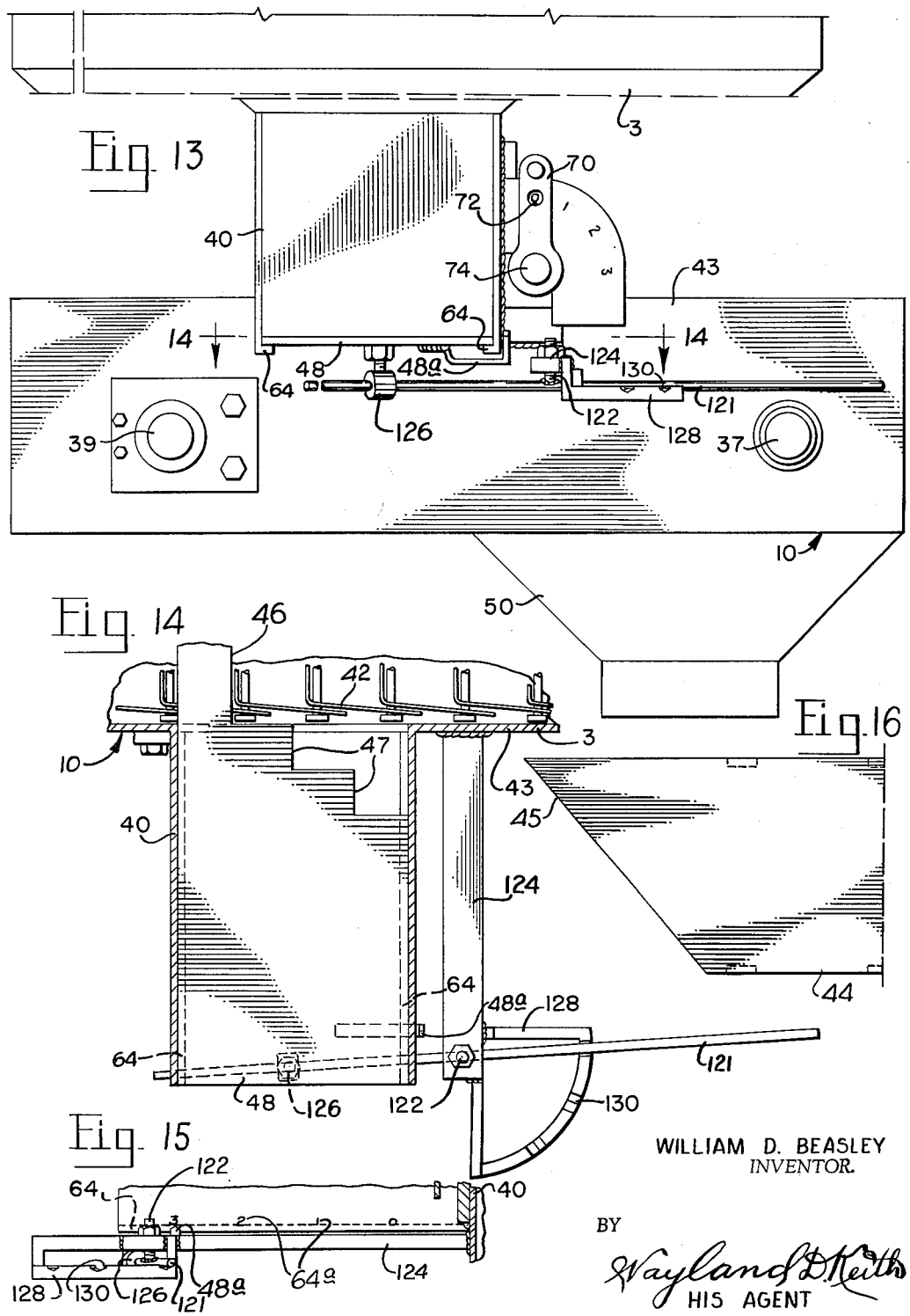

United States Patent Office 3,258,162
Patented June 28, 1966

3,258,162
METERING DEVICE FOR GRANULAR MATERIAL
William D. Beasley, Earth, Tex., assignor to The Hamby Company, Plainview, Tex., a corporation of Texas
Filed Oct. 6, 1964, Ser. No. 401,812
16 Claims. (Cl. 222—41)

This invention relates to improvements in metering devices and more particularly to metering devices for metering a predetermined amount of dry, granular material, powdered material or smooth type seeds, in accordance with a predetermined linear movement of an endless, perforate dispensing mechanism.

Various units have been proposed heretofore for dispensing dry granular material, seeds, and powdered material, but these, for the most part, utilized attachments for chains and the like, to drag the material out of the discharge end of a dispenser. The present device is an open, chain-like member which is so constructed as to dispense minute quantities of granular or powdered material, or smooth surface seeds or pellets directly therethrough, within the range and capabilities for which the dispensing mechanism is designed to operate.

The present device is so constructed that, with or without varying the lineal speed of the dispensing mechanism or of the tractor, the metered amount of material dispensed may be varied from one unit of measure to many times that amount, within the minimum and maximum capacity of the machine, and by varying the speed of the chain, a still greater range in the amount of material dispensed may be had.

The present device may be used in many fields of endeavor; however, for purposes of illustration, and for one example, the device will be described in connection with the dispensing of material as an agricultural implement transverses the terrain. The combination of two such units will produce a dual dispensing apparatus for dispensing dry granular material or the like in metered quantity, one unit being set to meter a few pounds per acre, while the other metering device may be adjusted to dispense up to a thousand pounds per acre, of another dry granular material. The present metering device may be used in conjunction with a planter or seed drill to enable a multiplicity of operations to be performed, thereby saving considerable time and expense over performing each operation separately.

The present metering device, particularly when used with an agricultural implement, is adapted to dispense a variety of granular materials, including seed, simultaneously, and the dispensing spouts or openings can be so arranged as to direct seeds or the like directly into furrows, together with certain types of fertilizers, and other materials not compatible with the seeds or fertilizer, can either be broadcast over the surface of the ground or directed to a side to side dress the soil with such materials as fungicides, pesticides, insecticides, minerals and the like, so the plants will not only be fertilized but immunized from insects, pests, plant disease, and the like.

An object of this invention is to provide a metering device which will handle one or materials simultaneously as the lineal dispensing mechanism is moved beneath respective hoppers.

Another object of the invention is to provide a metering device which will handle several dry, granular like materials, one from each hopper, while the mechanism is passing over the terrain.

Still another object of the invention is to provide a metering device for attachment to a planter or the like, which, by simple adjustments, will meter from a few pounds per acre up to a thousand pounds per acre.

Yet another object of the invention is to provide a metering device which may be minutely regulated to plant from a few pounds per acre to several bushels per acre of seeds which will flow by gravity from a hopper.

A further object of the invention is to provide a device which will meter dry insecticides from a hopper into the plant root zone while the seeds are being planted, so as to provide the plants which grow from the seed, with a systemic poison, which will be a deterrent against insects and rodents, which might otherwise devour the plants as they emerge from the seed.

Yet a further object of the invention is to provide a metering device to meter, into plant rows as the seed is planted, dry chemicals, for the control of weeds, and to direct fertilizer and/or direct insecticides into the furrow, or to broadcast such materials simultaneously with the movement of the metering device over the terrain.

Still another object of the invention is to provide a movable, endless, perforate, cellular member into which granular material is dispensed through an opening of predetermined size to give a measured amount of granular material thereinto to be dispensed therefrom.

Yet a further object of the invention is to provide a graduated regulating device which will control the size of an opening of a discharge chute, from a closed chute to the maximum capacity of the discharge thereof, and a further regulating member is provided to determine the thickness of the material dispensed onto the endless perforate member.

Still a further object of the invention is to provide a metering device which is simple in construction, easy to regulate, relatively trouble free in operation, and which is low in the cost of manufacture.

With the foregoing objects in mind and others which will become manifest as the description proceeds, reference is to be had to the accompanying drawings in which like reference characters designate like parts in the several views thereof, in which:

FIG. 3 is an enlarged, fragmentary elevational view of a hopper and dispensing mechanism, with parts broken away and shortened to bring out the details of construction;

FIG. 4 is a vertical sectional view through the metering device, taken on the line 4—4 of FIG. 5, looking in the direction indicated by the arrows, but looking in the opposite direction from the view shown in FIG. 3;

FIG. 5 is a front elevational view of the metering device, with parts being broken, with parts shortened and with parts shown in section to bring out the details of construction;

FIG. 6 is a sectional view taken approximately on the line 6—6 of FIG. 7, looking in the direction indicated by the arrows, with parts being broken away and with parts shortened to show the details of construction;

FIG. 7 is a top plan view of one hopper portion of the device, showing parts broken away and other parts being shown in section, to bring out the details of construction;

FIG. 8 is a fragmentary, perspective view of a portion of the endless, perforate, open mesh, cellular, chain-like member;

FIG. 9 is an enlarged, fragmentary elevational view showing the ground engaging wheel and the drive mechanism connected thereto, and showing adjustment means to adjust the tool bar and dispenser relative to the ground engaging wheel;

FIG. 10 is an elevational view similar to FIG. 9, but showing a drive mechanism connected to and associated with each of the dispensing mechanisms on a multi-hopper dispenser and showing the hoppers, the ground engaging shanks, and the frame work of the mechanism in dashed outline;

FIG. 11 is an enlarged, fragmentary perspective view showing the ground engaging wheel and the drive mechanism as viewed at angle with respect to the view shown in FIG. 9;

FIG. 12 is an enlarged, fragmentary elevational view taken at right angles to the view shown in FIG. 9, with parts broken away and with parts shortened to bring out the details of construction;

FIG. 13 is a view similar to FIG. 3, but showing a modified form of actuating mechanism for the step-cut, angulated regulator plate;

FIG. 14 is a sectional view taken on the line 14—14 of FIG. 13, looking in the direction indicated by the arrows, and showing a modified form of dispenser plate actuating mechanism;

Figure 1:
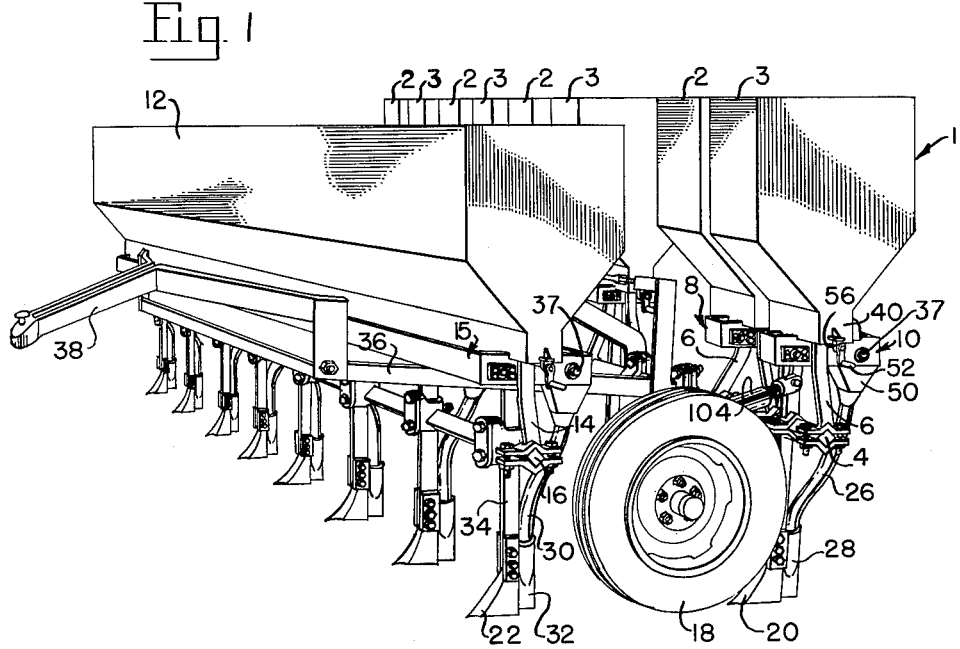
FIG. 1 is a perspective view of the device arranged with a plurality of hoppers for dispensing one or more pulverulent or granular materials and/or seeds therefrom simultaneously with the movement of the metering device over the terrain, some of which hoppers may be used to dispense seed into a furrow.
Figure 2:
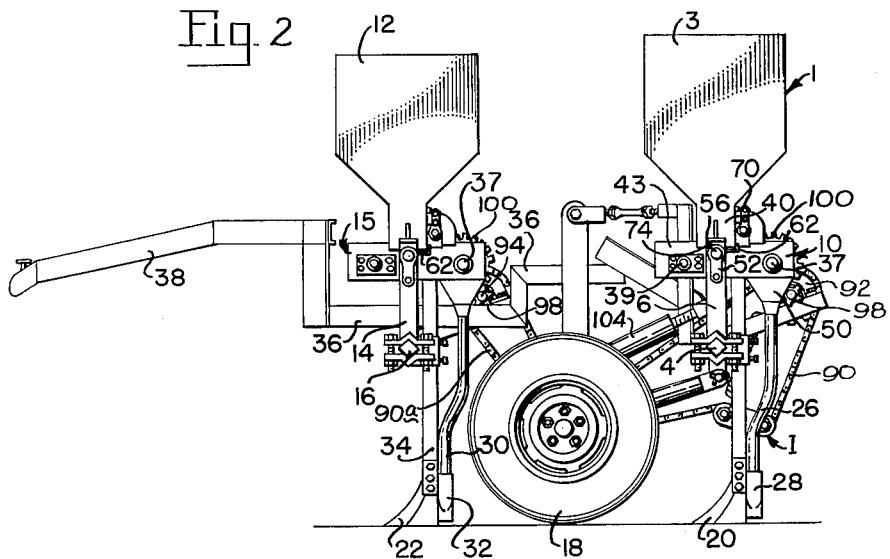
FIG. 2 is a side elevational view of the device shown in FIG. 1.

FIG. 15 is a fragmentary view, partly in section, of the lower, rear side of the dispensing mechanism as shown in FIGS. 13 and 14, and showing the adjusting mechanism and the indicia scale on the lower side of the dispensing mechanism; and FIG. 16 is a fragmentary view of the end of a support plate positioned beneath the neck of the dispensing hopper and showing an angulated end thereon for scattering granulated material in a regulated manner.

With more detailed reference to the drawing, the numeral 1 designates a wheeled vehicle having a frame 36, upon which frame a transverse implement mounting bar 4 is mounted. A plurality of hoppers 2 and 3, arranged in side-by-side relation, are supported on the transverse implement mounting bar 4 by upstanding support members 6 which are clamped to the bar 4 and extend upward to the lower sides of the respective hoppers 2 and 3. Each of the hoppers 2 and 3 has a dispensing mechanism for granular material as indicated at 8 and 10, and as will be more fully described hereinafter. An elongated hopper 12 is mounted forwardly of hoppers 2 and 3, and has a second series of upstanding support members 14 which support the hopper 12 on a second transverse implement mounting bar 16. The second hopper 12 has a single cavity formed therein, which cavity is in communication with respective longitudinally spaced apart dispensing mechanisms 15 for dispensing granular material.

Wheels 18 support the vehicle 1 for movement over the terrain, which wheels are adapted to regulate the depth of engagement of earth opening plows 20 and 22. Tubular members 24 and 26 extend downwardly from the respective hoppers 2 and 3 into the respective sleeves 28 which are mounted on the rear side of plows 20. Likewise, tubular members 30 extend from feeding mechanisms 15 on their lower side of hopper 12 into sleeves 32 which are mounted on the rear side of opening plows 22. The plows 22 are adjustably supported on the lower end of shanks 34. The frame 36 is mounted beneath the hoppers 2, 3, and 12 to which frame a tongue 38 is pivotally connected to enable a traction element to be coupled thereto to provide for the movement of the device over the terrain.

The plows 20 and 22 may be independently adjusted so that each will open a furrow to the desired depth, whereupon seeds, granular material, pellets or the like may be dispensed from the hoppers 2, 3 and 12 into the furrows, in the desired quantity, or by removing the spouts 24, 26 or 30, which are tubular members, the material may be dispensed broadcast onto the terrain.

The dispensing mechanisms for metering the material from the hoppers 2, 3 or 12 is shown in detail in FIGS. 3 through 7, however, as a matter of illustration and to aid in describing the metering and dispensation mechanisms, the metering mechanism of hopper 3 is designated at 10, is used to describe generally the mechanisms as shown at 8, 10 and 15.

The hopper 3 converges downwardly into a squared, elongated neck 40. The neck 40 has an opening formed in the complementary sides thereof, near the bottom end. An open link chain 42 is mounted in chain housing 43 and passes transversely below the lower, open end of squared neck 40. A plate 44 is mounted in chain housing 43 immediately below the neck 40 to support the chain 42 thereon, so granular material, seed, pulverulent or powdered material will pass through the open link chain 42 and be stopped by plate 44. The regulator slide 48 is slidably mounted in the complementary openings formed in the sides of squared neck 40, which regulator slide 48 has one or more openings 46 formed therein, which are of the shape as shown in FIG. 7, so as to direct granular material onto open link chain 42, when the opening or openings 46 in regulator slide 48 are open.

When the vehicle 1 is moved over the terrain, the chain 42 will be driven in the direction indicated by the arrow in FIG. 4, and the material passing through the opening or openings 46 in slide 48 will fill the openings within chain 42 and be moved along the plate 44 and dispensed off the end 45 of plate 44, with the granular material, seeds, powder or pellets falling downward through the lower reach of chain 42 into a dispensing chute 50, which chute leads into a tubular member, such as the members 24, 26 or 30, to be directed into a furrow behind plows, such as plows 20 or 22. The amount of material dispensed may be varied in accordance with the position or the opening or openings 46 in slide plate 48 of the metering or dispensing mechanism.

A crank 52 is provided on a screw 54, which screw is mounted in journaled relation in bearings 56 and 58 on transverse support members 64 and chain housing 43, respectively, so, upon rotation of the crank 52, a screw-threaded nut 60, which threadably engages screw 54, is moved along screw 54. The nut 60 is secured to the lower side of slide plate 48, so, upon rotation of screw 54, the plate 48 may be moved in graduated relation to expose an open portion thereof, from zero to the full amount of the opening or openings 46 in the plate. This will meter material in varying amounts in accordance with the degree of opening of the openings 46, to dispense the predetermined amounts of granular material, powdered material, pellets and/or seeds as they flow from the hopper. A pointer 62 is mounted on the side of screwthreaded nut 60 and is adapted to register with indicia on the lower side of the transverse support member 64 mounted beneath the respective hoppers 2, 3, and 12. In this manner the amount of granular material, seeds or the like dispensed for a predetermined movement over the terrain may be readily set and reckoned, depending upon the size of the opening in the squared neck 40, coupled with the width and thickness of chain 42. The indicia may represent either pounds per acre, bushels per acre, or even hundreds of pounds per acre, depending on the setting of a second adjustment slide or gate 66 taken with the other regulating elements of the dispensing mechanisms.

The gate 66, which is slidably mounted on squared neck 40, preferably has a rack 68 thereon to enable the gate 66 to be raised and lowered with respect to the upper face of the upper reach of chain 42. When in the position as shown in FIG. 4, the open links of chain 42 will be filled to a maximum depth, that is, the thickness of the chain. However, by regulating slide plate 48, the amount of material dispensed or metered from the respective hoppers can be far less. However, by movement of a second crank 70, various indicia will be visible through an opening 72 formed therein and the crank, as it is moved from zero toward 3, will cause the shaft to be rotated, which will, in turn rotate pinion 76 which is fixedly secured thereto. The pinion 76 is in mesh with rack 68 and will raise the lower end of gate 66, which will permit granular, pulverized or powdered material, pellets or flowable seeds to become heaped on the upper reach of chain 42, which material will pass through an opening 78 in a side of elongated, squared chute 40. With the gate 66 raised to the top portion of opening 78, the amount of material being metered or dispensed from the respective hoppers may amount to two or three times the amount of material dispensed in the chain alone, if the gate 66 was not raised. Therefore, it will be readily appreciated that the amount of material metered from a hopper can be widely varied, and most minute quantities of material, as in planting mustard seed, corn or the like, can be accurately gauged and, at the same time, other materials such as pulverulent insecticides, herbicides, or the like, or a mixture thereof may be used in a separate hopper for each row, or for the area overlying a row, if dispensed broadcast, and a still further hopper, such as hopper 12, may be used to dispense or meter fertilizer, such as sodium nitrate, or other chemical fertilizers. Therefore, a single pass over the terrain may be made to perform a multiplicity of operations, with precise metering of predetermined amounts of material being dispensed from the respective hoppers, thereby saving a great deal of time and labor.

A fragmentary portion of the chain 42 is shown in FIG. 8, which shows the openings through the chain, so the material may fall through the chain as the chain moves off plate 44. The chain 42 is mounted on spaced apart sprockets 41 and 43, the teeth of which are adapted to extend into the openings in the chain each time the chain is moved over the sprockets. The sprockets 41 and 43a are mounted on shafts 37 and 39 respectively, with the shaft 37 being driven by a gear 100 which is connected in geared relation to sprocket 92, which sprocket may be connected in geared relation to a ground engaging wheel, such as wheel 18 of the vehicle, so the amount of material dispensed will be in accordance with the area traversed by the vehicle. The plate 44 is preferably cut on a 45 degree angle, as indicated at 45, in FIGS. 4 and 16, which arrangement will give a graduated spreading of the material being dispensed from plate 44, as the chain-like member 42 moves in the direction indicated by the arrows in FIG. 4.

It is to be pointed out that the slide 48 preferably has an angular, stepped cut 47 on a side of opening 46, with the angular stepped cut extending substantially the full width of the opening, so when the slide is in one position, a graduated flow of granular material is had for a full width opening of one step, a full flow of granular material, or the like, therethrough may be had, onto chain 42, as shown in full outline in FIGS. 7 and 14, when all stepped openings have been moved to a position to fully open the opening 46. However, with the slide 48 in the position, as shown in dashed outline in FIG. 7, only a minute portion of the granular material will be dispensed onto the chain 42, or, if desired, the opening may be completely closed, which will permit the device to be transported over the terrain without dispensing any material.

Sprockets 80 and 82 are mounted on a stub shaft 84 which is secured to a bar 86 that is attachably connected to wheel 18 by lug bolts 88. A chain 90 surrounds sprocket 80 and a sprocket 92 mounted on shaft 94, which shaft 94 is journaled within bearings 96 mounted on the frame 36 of the vehicle. A pinion gear 98 is mounted on shaft 94, which pinion gear is in meshed driving relation with spur gear 100 mounted on shaft 37 so as to drive the shaft 37 in geared relation with the vehicle as the vehicle passes over the terrain.

When tandem hoppers, such as 2 and 12 are used, a chain 90a may pass around sprocket 82 and around sprocket 92 on hopper 12, which is similar to the sprocket 92 on hopper 2, as the drive mechanisms and metering mechanisms of the respective hoppers are substantially identical, however, a chain tightener or idler mechanism I is shown to automatically tighten chain 90, however, since the chain may be tightened by removing a link, the chain 90a has not been provided with a idler mechanism.

The wheel 18 is journaled on shaft 102 which is pivotally mounted with respect to frame 36 of the vehicle. A screw adjustment member 104 is interposed between the tool bar 4, mounted on frame 36, and a lug 106 which is secured to the angulated portion of shaft 102 so as to move the axle portion of the shaft 102 with respect to the tool bar 4 to enable the cutting depth of the plows 20 and 22 to be varied. As the screw adjustment member 104 is varied, the spring of the idler mechanism I will yield to compensate for the movement of shaft 84 to keep the chain 90 tight. The chain 90a, in the absence of an idler mechanism, may be adjusted by removing or inserting links to make the chain the desired tightness, or an idler mechanism, similar to the mechanism I, may be installed thereon.

*Modified form of invention*

A modified form of the invention is shown in FIGS. 13 through 16, wherein the neck 40 of the dispensing hopper 3 has a step-cut, angulated, regulator plate 48 slidable thereunder, which plate 48 is supported on inturned lip of support member 64. When the plate 48 is in one position, the opening in the lower end of the neck 40 will be closed, which opening will be opened by movement of lever 121 which is pivotally mounted in pivot pin 122. The pivot pin 122 is mounted on a support member 124 secured to the body of metering mechanism 10. The lever 121 extends through a sliding connection 126 which is attached to the lower side of the step-cut, angulated regulator plate 48, so that one of the steps 47, FIGS. 4 and 14, may be brought into register with the width of one of the openings in chain-like members 42 so the granular material passing through the substantially squared opening, will readily go into one width of the opening in chain-like member 42, however, by moving the lever 121 so that two steps 47 will be positioned above two box-like chain members, the output of granular material is increased two-fold over the original stepped opening. However, by moving the slide 48 further, by lever 121, additional steps will register with openings in chain-like member 42 until the full opening 46 is in register with the full opening in the bottom of the neck 40, so as to dispense the material in predetermined amounts, in accordance with the indicia 64a on the lower side of the support member 64 which is attached to the neck 40. It is preferable to have a pointer 48a attached to the step-cut, angulated regulator plate 48 and extends outward so as to move along the lower side of squared neck 40 as the plate 48 is moved back and forth so that the amount of opening in plate 48 may be readily determined by the indicia and pointer 64a and 48a.

It is preferable to have substantially the same drive mechanisms from the ground wheel 18 to shaft 37 on each of the hoppers 2 and 12, as well as substantially the same type granular dispensing mechanisms, except it is preferable to have an elongated granular dispensing mechanism, as shown at 12, to receive a mineral, herbicide, fungicide or insecticide so, with the hoppers 2 and 3, a greater variety of treatments can be made to the soil, while simultaneously planting crops, with the metered dispensing mechanism.

The support member 124 has an arcuate notched bar 128 secured thereto, as will best be seen in FIG. 14, so that the lever 121 may be moved into the desired notch, such as 130, and will be held in this position, due to the resiliency of the lever 121. In this manner the step-cut, angulated regulator plate 48 may be held in fixed relation to give the desired dispensing of granular material from hopper 2, 3 or 12.

While the invention and a modification thereof have been illustrated and described in some detail, it is to be understood that modifications and changes may be made in the minor details of construction and adjustments made for different installations, without departing from the spirit of the invention of the scope of the appended claims.

Having thus clearly shown and described my invention, what is claimed as new and is desired to be secured by Letters Patent is:

1. In a device for metering granular, flowable material in proportion to the linear movement of an associated element;
   (a) a drive member,
   (b) a movable, endless, open mesh, chain-like member,
   (c) a hollow receptacle, forming a chamber, to receive flowable, granular material,
      (1) said receptacle having an opening formed in the bottom thereof,
      (2) said receptacle having an opening formed in the lower portion of a side thereof in the direction of movement of the upper reach of said chain-like member,
   (d) a plate movably mounted in said receptacle below said opening in the bottom thereof which plate is above said endless, open mesh, chain-like member,
      (1) said movable plate having an opening formed therein within the length thereof, which plate is adapted to close said opening in the bottom of said receptacle when in one position and to open said opening a predetermined amount when said plate is in another position,
      (2) means connected to said plate which is movably mounted in said receptacle to move said plate a predetermined distance,
   (e) roller-like members journaled on said receptacle a spaced distance apart to receive said chain-like member therearound,
      (1) at least one of said roller-like members having teeth on the periphery thereof which are engageable with said chain-like member to move said chain-like member with respect to said plate,
   (f) a wiper plate mounted on one side of said receptacle a spaced distance above said chain-like member,
   (g) a stationary plate mounted beneath the upper reach of said chain-like member below the opening in the bottom of said receptacle and extending outwardly a predetermined distance in the direction of movement of the upper reach of said chain-like member.

2. In a device for metering granular, flowable material in proportion to the linear movement of an associated element:
   (a) a drive member,
   (b) a movable, endless, open mesh, chain-like member,
   (c) a hollow receptacle, forming a chamber, to receive flowable, granular material,
      (1) said receptacle having an opening formed in the bottom thereof,
      (2) said receptacle having an opening formed in the lower portion of a side thereof in the direction of movement of the upper reach of said chain-like member,
   (d) a plate movably mounted in said receptacle below said opening in the bottom thereof, which plate is above said endless, open mesh, chain-like member,
      (1) said movable plate having an opening formed therein within the length thereof, which plate is adapted to close said opening in the bottom of said receptacle when in one position and to open said opening a predetermined amount when said plate is in another position,
      (2) means connected to said plate which is movably mounted in said receptacle to move said plate a predetermined distance,
      (3) indicia on said receptacle to indicate the amount of material dispensed through said opening in said plate upon linear movement of said associated element,
   (e) roller-like members journaled on said receptacle a spaced distance apart to receive said chain-like member therearound,
      (1) at least one of said roller-like members having teeth on the periphery thereof which are engageable with said chain-like member to move said chain-like member with respect to said plate,
   (f) a vertically movable wiper plate mounted on the side of said receptacle having the opening formed therein, which wiper plate is in position to close said opening in the lower portion of the side of said receptacle when in one position and to open the opening a predetermined amount when in another position,
      (1) means connected to said wiper plate for moving said wiper plate relative to the opening in the side of said receptacle a gauged amount,
   (g) a plate mounted beneath said chain-like member below the opening in the bottom of said receptacle and extending outwardly in the direction of movement of said chain-like member a predetermined distance and having an angulated end thereon intermediate said roller and a vertical plane passing transversely medially through said wiper plate parallel to a face thereof.

3. A device for metering granular, flowable material in proportion to the linear movement of an associated element, as defined in claim 2, wherein:
   (a) said wiper plate has a rack mounted thereon and secured thereto,
   (b) a gear operatively associated with said rack,
   (c) a shaft journaled on said receptacle and mounting said gear to the lower side of said receptacle,
   (d) means connected to said shaft to rotate said shaft mounting said gear to move said wiper plate.

4. A device for metering granular, flowable material in proportion to the linear movement of an associated element, which element has a mounting bar, as defined in claim 1, wherein:
   (a) said metering device is mounted on a wheeled agricultural implement for movement over the terrain,
   (b) transmission gearing means connecting said chain-like member in geared driving relation with said agricultural implement so as to dispense flowable, granular material in a predetermined quantity to the area traversed.

5. A device for metering granular, flowable material in proportion to the linear movement of an associated element, as defined in claim 1, wherein:
   (a) said movable plate positioned above said chain-like member has a step cut angulated opening therein so as to give a progressively increasing area when said movable plate is moved in one direction and a progressively decreasing area to said opening when said movable plate is moved in the opposite direction.

6. A device for metering granular, flowable material in proportion to the linear movement of an associated element, as defined in claim 5, wherein:
   (a) said movable plate is moved by a screw member,
   (b) indicia positioned on said receptacle along the length of said screw member,
   (c) indicating means on said screw member which is movable upon rotation of said screw member to register with said indicia to enable direct computations of the amount of granular material dispensed by said chain-like member upon linear movement of the associated element.

7. A device for metering granular, flowable material in proportion to the linear movement of an associated element, as defined in claim 2, wherein:
   (a) said wiper plate has indicia associated therewith,
   (b) operating means associated with said indicia when multiplied by the indicia of said movable plate will give the amount of flowable, granular material dispensed in accordance with the linear movement of the associated element.

8. A device for metering granular, flowable material in proportion to the linear movement of an associated element, which element has a mounting bar, as defined in claim 4, wherein:
 (a) said agricultural implement has ground engaging plows mounted thereon to open furrows, and
 (b) a chute disposed below said chain-like member at the discharge end of said plate to direct flowable, granular material from at least some of said openings into one said furrow rearward of said plow.

9. A device for metering granular, flowable material in proportion to the linear movement of an associated element, which element has a mounting bar, as defined in claim 4, wherein:
 (a) said agricultural implement has ground engaging plows mounted thereon to open furrows,
 (b) a chute disposed below said chain-like member at the discharge end of said plate to direct flowable, granular material from at least some of said openings into said furrows rearward of said plow, and
 (c) said flowable, granular material may be directed to a point other than the chute leading into said furrow.

10. A device for metering granular, flowable material in proportion to the linear movement of an associated element, which element has a mounting bar, as defined in claim 4, wherein:
 (a) said agricultural implement has a plurality of chambers arranged in side-by-side relation, whereby a plurality of materials may be dispensed simultaneously at one pass over the terrain.

11. A device for metering granular, flowable material in proportion to the linear movement of an associated element, which element has a mounting bar, as defined in claim 4, wherein:
 (a) said agricultural implement has a plurality of chambers arranged in side-by-side relation, and
 (b) at least one chamber is arranged in tandem relation, whereby a multiplicity of materials may be dispensed in substantially the same area, at one pass of said implement over the terrain.

12. A device for metering granular, flowable material in proportion to the linear movement of an associated element, which element has a mounting bar, as defined in claim 4, wherein:
 (a) said agricultural implement has a plurality of chambers arranged in side-by-side relation,
 (b) and wherein, at least one chamber is arranged in tandem relation, whereby a multiplicity of materials may be dispensed substantially in the same area, at one pass of said implement over the terrain, and
 (c) at least one of said chambers is hopper-like and extends substantially the full width of the implement for dispensing flowable, granular material therefrom.

13. A device for metering granular, flowable material in proportion to the linear movement of an associated element, as defined in claim 1, wherein:
 (a) said stationary plate has an angulated cut on the discharge end thereof.

14. A device for metering granular, flowable material in proportion to the linear movement of an associated element, as defined in claim 13, wherein:
 (a) said angulated cut is substantially 45 degrees.

15. In a device for metering granular, flowable material in proportion to the linear movement of an associated element:
 (a) a drive member,
 (b) a movable, endless, open mesh, chain-like member,
 (c) a hollow receptacle, forming a chamber, to receive flowable, granular material,
  (1) said receptacle having an opening formed in the bottom thereof,
  (2) said receptacle having an opening formed in the lower portion of a side thereof in the direction of movement of the upper reach of said chain-like member,
 (d) a plate movably mounted in said receptacle below said opening in the bottom thereof which plate is above said endless, open mesh, chain-like member,
  (1) said movable plate having an opening formed therein within the length thereof, which plate is adapted to close said opening in the bottom of said receptacle when in one position and to open said opening a predetermined amount when said plate is in another position,
  (2) means connected to said plate which is movably mounted in said receptacle to move said plate a predetermined distance,
 (e) roller-like members journaled on said receptacle a spaced distance apart to receive said chain-like member therearound,
  (1) at least one of said roller-like members having teeth on the periphery thereof which are engageable with said chain-like member to move said chain-like member with respect to said plate,
 (f) a wiper plate mounted on one side of said receptacle a spaced distance above said chain-like member,
 (g) a stationary plate mounted beneath the upper reach of said chain-like member below the opening in the bottom of said receptacle and extending outwardly a predetermined distance in the direction of movement of the upper reach of said chain-like member,
 (h) a lever pivotally mounted on said receptacle, and
 (i) pivot means pivotally connecting said lever to said movable plate in said receptacle to control the movement of said plate relative to the opening in the bottom thereof.

16. A device for metering granular, flowable material in proportion to the linear movement of an associated element, as defined in claim 15, wherein:
 (a) means on said receptacle for maintaining said lever in adjusted fixed relation with respect thereto, and
 (b) means associated with said receptacle indicating the relative position of said movable plate member with respect to the opening in the bottom of said receptacle.

References Cited by the Examiner
UNITED STATES PATENTS

| | | | |
|---|---|---|---|
| 1,327,455 | 1/1920 | Willis et al. | 222—41 |
| 1,840,455 | 1/1932 | Lea | 222—55 X |
| 2,088,334 | 7/1937 | Merchen | 222—55 |
| 2,619,261 | 11/1952 | Pick et al. | 222—371 |
| 2,770,400 | 11/1956 | Mattson | 222—371 X |

LOUIS J. DEMBO, *Primary Examiner.*

C. R. CARTER, *Assistant Examiner.*